3,079,430
PROCESS FOR PREPARING VINYLAROMATIC SULFONIC ACID SALTS
Charles T. Goodshaw and Charles E. Grabiel, Midland, and Henry Volk, Bay City, Mich., assignors to The Dow Chemical Company, Midland, Mich., a corporation of Delaware
Filed Oct. 29, 1958, Ser. No. 770,542
4 Claims. (Cl. 260—505)

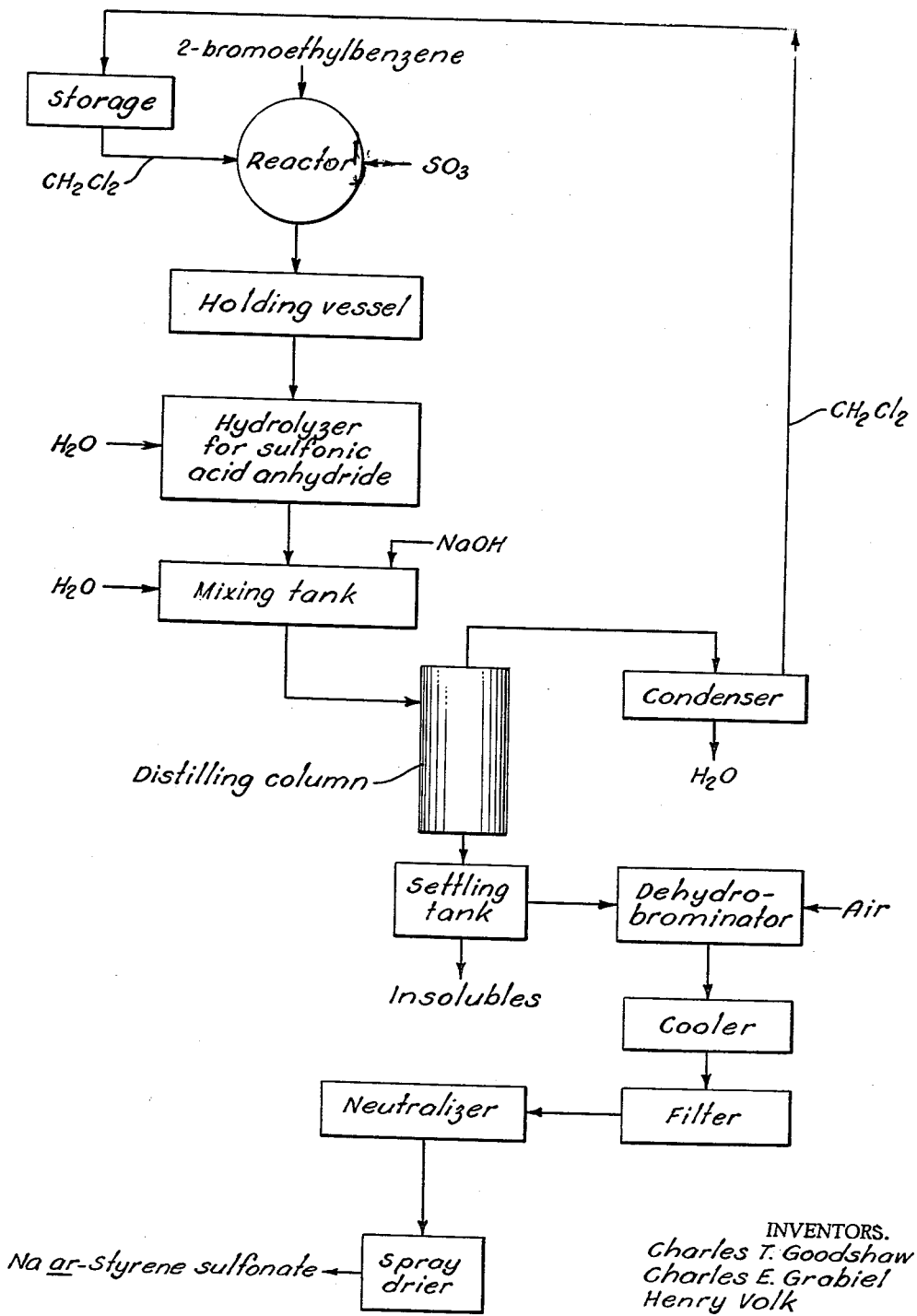

This invention concerns an improved method for making nuclear sulfonated vinylaromatic compounds and their alkali metal salts having the general formula $CH_2=CH-Ar-SO_3M$, wherein Ar represents an aromatic group containing from 6 to 8 carbon atoms, and M represents H or an equivalent of an alkali metal.

In the known preparation of such compounds by reacting together approximately equimolar amounts of sulfur trioxide and a β-haloethylaryl compound and treating the resulting β-haloethylaryl sulfonic acid with an alkali to dehydrohalogenate the same and form a salt of the vinylaryl sulfonic acid thus formed, several disadvantages have been noted. First, considerable sulfone by-product is formed. Such sulfone by-product is worthless and must now be discarded. Its formation is catalyzed by boron oxide present as a stabilizer in commercial liquid sulfur trioxide, widely used in sulfonating β-haloethylaryl compounds. Second, an appreciable amount of by-product vinylaryl sulfonic acid anhydride is formed, i.e., from about 10 to 30 weight percent, β-haloethylaryl basis. Third, the conventional method leaves considerable unreacted haloethylaryl compound. Fourth, in water-extracting the vinylaryl sulfonate from the reaction medium conventionally containing inert polychlorinated aliphatic hydrocarbon solvent, the conventional way for separating intermediate product from sulfone, an appreciable amount of sulfonic acid is thereby lost since it is somewhat soluble in the water-wet polychlorinated aliphatic hydrocarbon. Fifth, polymer formation in the dehydrohalogenation and sulfonate recovery operations reduces product yield and plugs reactors. The known method, therefore, usually gives approximately a 55 percent maximum yield of nuclear sulfonated vinylaromatic sulfonic acid and salts, based on β-haloethylaryl reactant.

It has now been discovered that the disadvantages of the prior art can be overcome and the yield of nuclear sulfonated vinylaryl compounds and their salts can be raised to about 85 percent and higher by (1) reacting together at least an equimolar proportion, and preferably an excess, of unstabilized (boron oxide-free) sulfur trioxide and a β-haloethylaryl compound in solution in an inert polychlorinated aliphatic hydrocarbon solvent, i.e. from about 1.0 to about 2.0 mole equivalents of sulfur trioxide per mole of β-haloethylaryl reactant, (2) allowing the resultant sulfonation reaction mixture to stand for a period of time up to about 4 hours until substantially maximum sulfonation has been attained, (3) then adding from about 0.5 to about 5 weight percent of water, theoretical sulfonic acid basis, dependent upon the amount of excess $SO_3$ used, to hydrolyze by-product sulfonic acid anhydride to sulfonic acid, (4) adding excess aqueous caustic to form sulfonate salt, to neutralize excess acid and to neutralize hydrogen halide evolved on subsequent dehydrohalogenation, (5) flash distilling off the inert solvent, (6) removing any insoluble matter from the remaining solution, (7) heating the remaining aqueous phase until dehydrohalogenation is substantially complete in the presence of air or oxygen to prevent polymer formation, (8) neutralizing excess base, and (9) recovering vinylaryl sulfonate product, as by spray drying or crystallization. The process is illustrated in the accompanying diagrammatic flow sheet.

The β-haloethylaryl compounds which are employed as starting materials in the process of this invention have the general formula $Ar-CH_2-CH_2-X$, wherein Ar is an aromatic group containing from 6 to 8 carbon atoms and X is chlorine or bromine. Exemplary of such compounds are β-chloroethylbenzene, β-bromoethylbenzene, α-methyl-β-bromoethylbenzene, α-methyl-β-chloroethylbenzene, ar-(β-chloroethyl)toluene, ar-(β-bromoethyl) toluene, ar-(β-bromoethyl)xylene, ar-(β-chloroethyl) mesitylene, ar-(β-bromoethyl)mesitylene, β-chloroethylnaphthalene, β-bromoethylnaphthalene, β-chloroethylchlorobenzene, β-bromoethylchlorobenzene, β-bromoethylbromobenzene, β-bromoethyldichlorobenzene, β-chloroethyldichlorobenzene, etc.

The β-haloethylaryl compound is sulfonated by treatment with about 1.0 to about 2.0 times its molar equivalent of sulfur trioxide at a temperature between about −20° and 80° C. Below 1.0 mole equivalent of sulfur trioxide per mole of β-haloethyl compound, reaction tends to be incomplete within a reasonable time, while larger amounts than 2.0 mole equivalents of sulfur trioxide are uneconomic. The reactants can be mixed in any order, e.g., by pouring the aryl reactant into a liquid body comprising the sulfur trioxide or causing separate streams to flow together at rates such as to form a mixture of reactants in the indicated proportions. The sulfur trioxide is preferably fed into a liquid stream comprising the β-haloethylaryl reactant in a continuous process so as to maintain at least an equimolar proportion of reactants at all stages of the reaction. The reaction mixture is advantageously stirred or otherwise agitated during reaction. The sulfur trioxide is used in liquid or vapor form, diluted or undiluted, when fed to the sulfonate reaction. Suitable diluents include nitrogen, liquid or gaseous sulfur dioxide, and liquid polychlorinated aliphatic hydrocarbons as described below.

The β-haloethylaryl compound is in solution when subjected to sulfonation, e.g., from about 1 to about 70 weight percent solution and preferably from about 5 to about 30 percent in a liquid polychlorinated aliphatic hydrocarbon, such as carbon tetrachloride, ethylene dichloride, chloroform, methylene chloride, etc. Methylene chloride is preferred.

The optimum reaction conditions are dependent upon variable factors, such as the kind and amount of diluent present in the reaction mixture, the mode of admixing the reactants, and the reaction temperature, certain of which variable factors are interdependent. Sulfur trioxide is capable of reacting not only to sulfonate the β-haloethyl aromatic compound in the desired manner, but also to form sulfone by-product such as bis-(β-bromoethylphenyl) sulfone and bromoethylbenzene sulfonic anhydride. It is also capable of reacting to an appreciable extent with liquid polychlorinated aliphatic hydrocarbons such as are usually employed as media for the reaction, to form other undesired by-products. The reactions to form by-products occur more extensively as the reaction temperature is raised, especially above 50° C. The reaction to form an organic sulfone also occurs more extensively with increase in the concentration of the reactants in the reaction mixture and is suppressed by carrying the reaction out in the presence of one or more of the aforementioned liquid diluents.

For these reasons the sulfonation is usually carried out at temperatures between about −10° and 50° C. by feeding sulfur trioxide in liquid or vaporized form into a solution of the β-haloethylaromatic compound in one or more of the aforementioned liquid solvents while stirring or otherwise agitating the resulting mixture. However, by suitable balance between the above-mentioned variable reaction conditions, the sulfonation can be carried out at somewhat lower or higher temperatures, e.g., at temperatures of −20° to 80° C. The sulfonation is usually accomplished at atmospheric pressure or thereabout, but it can be carried out in a closed reaction system at pressures up to 100 pounds per square inch gauge or above.

The sulfonation medium is held for a period of time, usually about 2 to 4 hours until substantially maximum sulfonation has been attained, as determined by testing an aliquot. This holding period at reaction temperature has been found to decrease unreacted β-haloethylaromatic reactant to a maximum of less than 5 percent of charged β-haloethylaromatic compound.

After attaining maximum reaction by the indicated holdup, a quantity of about 0.5 up to about 5 weight percent of water, based on theoretical sulfonic acid formed, and depending upon the amount of $SO_3$ reacted, is then added. It converts the sulfonic acid anhydride by-product to the wanted sulfonic acid.

Aqueous caustic, advantageously in excess, as a 50 weight precent solution, together with water sufficient to give the desired final concentration of product, is then added to the reaction medium, advantageously first cooled to room temperature, in amount of about 2.1 molar proportions of caustic per mole of added sulfur trioxide, to form sulfonate, to neutralize excess acid and to neutralize hydrogen halide to be liberated in the dehydrohalogenation reaction.

The alkaline reaction medium is then flash distilled to remove solvent. The distillation also serves to hydrolyze any remaining by-product sulfonic acid anhydride to the desired sulfonate. Previously, sulfonic acid has been extracted from polychlorinated solvent by means of water. Because of the solubility of the sulfonic acid solution in the thereby water-wet polychlorinated solvent and because of poor separation of phases, as much as 10 percent of the sulfonic acid has been lost in the solvent phase by this prior art method.

Any insoluble matter remaining in the reaction medium after the solvent stripping is removed, advantageously by settling out in a settler or by filtration, and the intermediate sulfonate in the alkaline reaction medium is then dehydrohalogenated by heating to a temperature between about 50° and 100° C., advantageously for between about ¼ and ½ hour. During the dehydrohalogenation, air or oxygen is bubbled through to minimize polymer formulation.

After dehydrohalogenation is substantially complete, as determined by testing an aliquot, excess base is neutralized, advantageously by adding mineral acid, and the vinylaryl sulfonate product is recovered by spray drying or by crystallization.

The following examples are in illustration of and not in limitation of the invention, which is defined in the claims.

*Example 1.—Continuous Preparation of Sodium Styrene Sulfonate*

A quantity of 50.6 lb./hr. of 2-bromoethylbenzene and 540 lb./hr. of methylene chloride at −25° C. were pumped continuously into a stainless steel mixer reactor. Commercial grade anhydrous liquid sulfur trioxide containing ca. 5 weight percent boron oxide stabilizer was pumped into a distillation unit at the rate of 23.4 lb./hr. and the boron oxide-free $SO_3$ vapors were fed to the stainless steel mixer reactor where sulfonation took place. The molar proportion of $SO_3$ to 2-bromoethylbenzene was about 1.1 to 1. The temperature of the resulting 2-bromoethylbenzene sulfonic acid solution leaving the mixer reactor was 55°–60° C. The sulfonic acid solution was then passed into the bottom of a glass-lined holding column of such capacity to provide on the average of 3 hours' retention time to complete the sulfonation reaction. The solution was then passed to a second stainless steel tank where 0.67 lb./hr. of water were introduced to aid in the hydrolysis of the p-(2-bromoethylphenyl) sulfonic acid anhydride by-product to 2-bromoethylbenzene sulfonic acid. After passing through this second tank (which provided on the average of 2 hours' retention time), the sulfonic acid solution was passed to a stainless steel pipe mixer where it was contacted with a sufficient amount of water to give a 10 percent solution of the finished sodium styrene sulfonate. Also introduced at this point was a sufficient amount of aqueous 50 percent sodium hydroxide to provide 2.1 equivalents of base per equivalent of total acid in the sulfonic acid solution. After passing through the pipe mixer, the combined streams were sent to a jacketed, steam-heated stripper column which was heated to 48° C. The methylene chloride was flashed off overhead to a cooler and water separator and then recovered for a recycle. The aqueous phase passed downstream to a jacketed, cooled, stainless steel, settling drum where any solids or unreacted 2-bromoethylbenzene were separated. The aqueous phase was then passed to the bottom of a dehydrobrominator, which consisted of a baffled, agitated, stainless steel tank which was jacketed and heated with steam to 82°–86° C. A stream of air was sparged into the solution as it entered the bottom of the tank to minimize polymerization of the sodium styrene sulfonate as it formed. After an average of one hour's retention time in the dehydrobrominator, the sodium styrene sulfonate solution was passed to a cooling tank where it was cooled to room temperature. The cooled solution was filtered in the presence of filter aid, then passed to a neutralizer where it was neutralized to pH 7.5 with concentrated sulfuric acid. After adding inhibitor, the aqueous 10 percent solution of sodium styrene sulfonate (85 percent yield, 2-bromoethylbenzene basis) was spray dried in a Nichols hot air spray drier. The spray dried material analyzed sodium styrene sulfonate, 48–54 percent, and sodium bromide, 27–33 percent.

*Example 2.—Batch Preparation of Sodium Styrene Sulfonate*

A quantity of 92.5 grams (0.5 mole) of 2-bromoethylbenzene and 723 g. of methylene chloride was placed in a 2-liter, 3-necked flask which was equipped with a water cooled condenser, stirrer and dropping funnel. A quantity of 25 ml. of distilled, anhydrous, boron oxide-free sulfur trioxide (0.6 mole) was dissolved in 432 g. of methylene chloride and added to the above dropwise with good agitation over a 5-minute period. The temperature went from 20° to 40° C. during the addition of the sulfur trioxide. Stirring was continued for an additional 10 minutes. The sulfonation mixture was poured into a stirred, 3-liter, 3-necked flask which contained a solution of 59.6 g. (1.5 mole) of sodium hydroxide in 927 g. of water. The methylene chloride was distilled from the mixture at atmospheric pressure, and the aqueous phase was then heated at 80° to 97° C. for 0.5 hour. Air was sparged through the charge during the dehydrobromination. The aqueous phase was analyzed and found to contain 8.66 percent sodium styrene sulfonate which was equivalent to a 92.1 percent yield, 2-bromoethylbenzene basis.

*Example 3.—Batch Preparation of Sodium Vinyltoluene Sulfonate*

A quantity of 99.5 g. (0.5 mole) of mixed isomers of 2-bromoethyltoluene and 810 g. of methylene chloride was placed in a 2-liter, 3-necked flask which was equipped with a water cooled condenser, stirrer and dropping funnel. A quantity of 25 ml. of distilled anhydrous sulfur trioxide (0.6 mole) was dissolved in 432 g. of methylene chloride and added to the above by means of a dropping funnel with good agitation over a 6-minute period. The temperature went from 25° to 40.5° C. during the addition of the sulfur trioxide. After stirring an additional 10 minutes, the sulfonation mixture was poured into a 3-liter, 3-necked flask which contained a solution of 58 g. (1.45 moles) of sodium hydroxide in 990 g. of water. The methylene chloride was distilled off at atmospheric pressure and the aqueous phase was then heated with stirring at 80° C. for 0.5 hour. The solution was analyzed and found to contain 8.03 percent sodium vinyltoluene sulfonate. This was equivalent to an 85 percent yield, 2-bromoethyltoluene basis.

Some of the water was evaporated from the dehydrobrominated solution and the resulting precipitate filtered off and vacuum dried at room temperature. A white crystalline product was obtained, analyzing 90.8 percent sodium vinyltoluene sulfonate.

*Example 4.—Batch Preparation of Sodium Dichlorostyrene Sulfonate*

A quantity of 25 g. of mixed isomers of dichloro(2-bromethyl)benzene and 171 g. of methylene chloride was placed in a 500 ml. 3-necked flask equipped with a condenser, stirrer and dropping funnel. To the above was added by means of a dropping funnel 8.2 ml. (15.7 g.) of distilled boron oxide-free sulfur trioxide dissolved in 141 g. of methylene chloride. The molar proportion of $SO_3$ to dichloro(2-bromoethyl)benzene was 2 to 1. The addition required 5 minutes. The temperature rose from 20° to 33° C.

After standing overnight, the resulting sulfonate was dehydrobrominated in the following manner: 450 g. of water and 16.6 g. of sodium hydroxide were placed in a 1-liter, 3-necked flask equipped with an air sparger, stirrer, heating mantle and thermometer. To this was added the sulfonation solution. The methylene chloride was flashed off and the aqueous phase was heated 0.5 hour at 80° C. Air was sparged into the charge during the dehydrobromination. A 93 percent yield of sodium dichlorostyrene sulfonate was obtained based on the charged bromoethylbenzene. When the preparation was repeated with a 20 percent molar excess of sulfur trioxide, the yield of sodium dichlorostyrene sulfonate was reduced to 75.2 percent.

*Example 5.—Effect of Boron Oxide On Formation of p,p'-Bis(2-Bromoethylphenyl) Sulfone*

α-Bromethylbenzene was sulfonated batchwise with Sulfan B (commercial grade sulfur trioxide), stabilized with about 5 percent boron oxide) and with distilled Sulfan B free of boron oxide. The results in following Table I show that formation of the undesired p,p'-bis(2-bromoethylphenyl) sulfone is catalyzed by the presence of the boron oxide stabilizer in Sulfan B. When distilled Sulfan B was used in the sulfonation, only 1.3 to 1.9 percent sulfone was formed based on 2-bromoethylbenzene as compared with 6.5 percent when using Sulfan B. Also, when 3.9 weight percent additional boron oxide was added to Sulfan B, the yield of sulfone was increased to 13.7 percent. A 7.4 percent yield of sulfone was obtained when 5.5 weight percent boron oxide was added to distilled Sulfan B.

The typical procedure used for the sulfonations is as follows. A quantity of 57.4 g. (0.31 mole) of 2-bromoethylbenzene and 610 g. of methylene chloride was placed in a 1-liter, 3-neck flask equipped with a dropping funnel, stirrer, condenser, thermometer and heating mantle. The solution was heated to reflux (42° C.) and 14.2 ml. (0.34 mole) of sulfur trioxide was then added dropwise over a 10-minute period. The charge was stirred 5 additional minutes, then poured into about 1-liter of water. After stirring for about 5 minutes to remove the water soluble sulfonic acid, the methylene chloride layer was separated and analyzed for p,p'-bis(2-bromoethylphenyl)sulfone by spectroscopy.

TABLE I

*Effect of Boron Oxide on Sulfone[a] Formation*

| Run | BEB[b] (gms.) | MeCl$_2$[c] (gms.) | SO$_3$, ml. | Type SO$_3$ | B$_2$O$_3$[d], percent | Percent yield[e] sulfone |
|---|---|---|---|---|---|---|
| 1 | 57.4 | 610 | 26.5 | Sulfan B | ca. 5 | 6.5 |
| 2 | 57.4 | 610 | 26.5 | ---do--- | ca. 8.9 | 13.7 |
| 3 | 57.4 | 610 | 26.5 | Distilled | 0 | 1.9 |
| 4 | 57.4 | 610 | 14.2 | ---do--- | 0 | 1.3 |
| 5 | 57.4 | 610 | 14.2 | ---do--- | 5.5 (added) | 7.4 |

[a] p,p'-bis(2-bromoethylbenzene) sulfone.
[b] 2-bromoethylbenzene.
[c] Methylene chloride.
[d] Percent B$_2$O$_3$ based on SO$_3$.
[e] Percent yield based on 2-bromoethylbenzene.

*Example 6.—Extraction of 2-Bromoethylbenzene Sulfonic Acid and p-(2-Bromoethylphenyl)Sulfonic Acid Anhydride From a Methylene Chloride Solution of Sulfonated 2-Bromoethylbenzene*

An improved yield of 2-bromoethylbenzene sulfonic acid was obtained, as shown in following Table II, when the sulfonation solution was extracted by flash distilling the methylene chloride in the sulfonation solution from an aqueous caustic solution. The increased yield was due to complete removal of all the sulfonic acid as well as the hydrolysis of the p-(2-bromoethylphenyl)sulfonic acid anhydride which is also formed during the sulfonation reaction. Simply extracting the sulfonation solution by stirring with water (the prior art method) does not effectively cause hydrolysis of the water insoluble anhydride nor does it completely remove all of the sulfonic acid. Although the yield of 2-bromoethylbenzene sulfonic acid was increased 7 percent when the stirring time was increased from 5 to 33 minutes, the flash method gave still another 32 percent increase. Following is a description of a typical procedure used in extracting the 2-bromoethylbenzene by: (1) stirring the sulfonation solution in the presence of water, and (2) the flash method.

(1) A 1-liter sample of sulfonation solution taken from the sulfonation mixer reactor during a continuous run, as described in Example 1, was extracted by stirring with 500 ml. of water for a predetermined time. The water extract was then placed in a 1-liter flask equipped with a stirrer, thermometer and heating mantle. To this was added 67 g. of sodium hydroxide (2.1 equivalents of sodium hydroxide per equivalent of total acid in the water extract). After heating 0.5 hour at 80° C., the solution was analyzed for sodium bromide and sodium styrene sulfonate. The yield of 2-bromoethylbenzene was based on the sodium bromide formed.

(2) A 1-liter duplicate sample of sulfonation solution as in preceding part (1) was added to 567 g. of aqueous 11.8 percent caustic which was contained in a 2-liter flask equipped with a stirrer, thermometer and heating mantle. Sufficient caustic was present to provide 2.1 equivalents per equivalent of total acid in the sulfonation solution. The methylene chloride in the sulfonation solution was then flash distilled and the aqueous phase was heated 0.5 hour at 80° C. The solution was analyzed and the yield of 2-bromoethylbenzene sulfonic acid determined as described under (1).

TABLE II

*Comparison of Extraction Methods*

| Run | Method | Sulfonation solution, ml. H₂O/ml. | Contact time (mins.) | Yield,* BEB-SO₃H | Molar ratio, NaSS/NaBr | Extraction** efficiency** (percent) |
|---|---|---|---|---|---|---|
| 1 | (1) | 0.5 | 5 | 0.0619 | 0.97 | 63 |
| 2 | (1) | 0.5 | 33 | 0.0694 | 1.00 | 70 |
| 3 | (2) | 0.5 | ---- | 0.0989 | 0.95 | 100 |

CODE:
BEB-SO₃H=2-bromoethylbenzene sulfonic acid.
NaSS=Sodium styrene sulfonate.
Sulfonation solution=A methylene chloride solution of sulfonated 2-bromoethylbenzene.

(1) The sulfonation solution was extracted with water.
(2) The sulfonation solution and aqueous caustic were combined and the methylene chloride was then flash distilled off.

*The yield is expressed in grams BEB-SO₃H/gram of sulfonation solution and is based on the sodium bromide formed after dehydrobrominating the extract by heating at 80° C. for 0.5 hour.
**The extraction efficiency of runs 1 and 2 was based on run 3.

What is claimed is:

1. A method for making a salt of a vinylaromatic sulfonic acid by sulfonating a β-haloethyl aromatic compound containing from 8 to 10 carbon atoms in solution in a polychlorinated aliphatic liquid hydrocarbon by reaction with approximately 1.0 to 2.0 times its molar equivalent of purified sulfur trioxide at a reaction temperature between about −20° and 80° C., holding the reaction mixture for a time sufficient, up to about 4 hours, to obtain substantially the maximum yield of resulting β-haloethylaryl sulfonic acid, adding a small amount of water from 0.5 to 5 weight percent, theoretical sulfonic acid basis, sufficient to hydrolyze by-product sulfonic acid anhydride, adding to the reaction medium excess aqueous alkali over that required to neutralize excess sulfonation acid, sulfonic acid product and to neutralize hydrogen halide which results from dehydrohalogenation of the β-haloethylaryl sulfonic acid, in amount of the order of 2.1 moles of alkali per mole of added sulfur trioxide, water present being in amount sufficient to give the desired solution concentration of final product, distilling off the polychlorinated aliphatic liquid hydrocarbon, separating insoluble matter from the remaining mixture of reaction medium and aqueous alkali and heating the resulting aqueous mixture at about 50° to about 100° C. while oxygen is bubbled therethrough to minimize polymer formation until dehydrohalogenation is substantially complete.

2. Method of claim 1, wherein the β-haloethylaromatic compound is 2-bromethylbenzene.

3. Method of claim 1, wherein the β-haloethylaromatic compound is a 2-bromoethyltoluene.

4. Method of claim 1, wherein the β-haloethylaromatic compound is a dichloro(2-bromethyl)-benzene.

References Cited in the file of this patent
UNITED STATES PATENTS 2,821,549    Mock _____ Jan. 28, 1958